United States Patent
Zhao et al.

(10) Patent No.: US 12,244,506 B2
(45) Date of Patent: Mar. 4, 2025

(54) BANDWIDTH UTILIZATION-BASED CONGESTION CONTROL

(71) Applicant: VMware LLC, Palo Alto, CA (US)

(72) Inventors: Yanlei Zhao, Saratoga, CA (US); Arunachalam Ramanathan, Union City, CA (US); Alexander Krits, Austin, TX (US); Yixin Zou, San Jose, CA (US); Zexing Jiang, Santa Clara, CA (US); Radhika Vyas, Cupertino, CA (US); Pavan Narasimhaprasad, Cedar Park, TX (US); Gabriel Tarasuk-Levin, San Francisco, CA (US)

(73) Assignee: VMware LLC, Palo Alto, CA (US)

( * ) Notice: Subject to any disclaimer, the term of this patent is extended or adjusted under 35 U.S.C. 154(b) by 65 days.

(21) Appl. No.: 18/214,470

(22) Filed: Jun. 26, 2023

(65) Prior Publication Data
US 2024/0430208 A1  Dec. 26, 2024

(51) Int. Cl.
*H04L 12/26* (2006.01)
*H04L 12/24* (2006.01)
*H04L 12/801* (2013.01)
*H04L 47/11* (2022.01)
*H04L 47/12* (2022.01)
*H04L 47/27* (2022.01)

(52) U.S. Cl.
CPC ............ *H04L 47/27* (2013.01); *H04L 47/12* (2013.01)

(58) Field of Classification Search
CPC ....... H04L 47/27; H04L 47/12; H04L 47/127; H04L 47/11; H04L 47/283; H04L 12/26; H04L 12/24; H04L 12/801
USPC .......................................................... 709/238
See application file for complete search history.

(56) References Cited

U.S. PATENT DOCUMENTS

| | | | |
|---|---|---|---|
| 2008/0219164 A1* | 9/2008 | Shimonishi | H04L 69/163 370/468 |
| 2010/0250767 A1* | 9/2010 | Barreto | H04L 69/16 709/233 |

(Continued)

OTHER PUBLICATIONS

Non-Published Commonly Owned Related U.S. Appl. No. 18/214,473 with similar specification, filed Jun. 26, 2023, 45 pages, VMware, Inc.

(Continued)

*Primary Examiner* — Jude Jean Gilles
(74) *Attorney, Agent, or Firm* — Quarles & Brady LLP

(57) ABSTRACT

Some embodiments of the invention provide a method for performing congestion control for a particular packet flow associated with a source first host computer operating in a network. The method is performed at the first source host computer. The method determines a bandwidth threshold specified for the particular packet flow. Based on the bandwidth threshold, the method allocates an amount of bandwidth to the particular packet flow. The method periodically receives sets of contextual data associated with the particular packet flow. For the received sets of contextual data, the method iteratively (1) computes a current bandwidth consumption by the particular packet flow and (2) based on the sets of contextual data and the current bandwidth consumption, adjusts the amount of bandwidth allocated to the particular packet flow.

20 Claims, 12 Drawing Sheets

(56) References Cited

U.S. PATENT DOCUMENTS

| | | | | |
|---|---|---|---|---|
| 2010/0250770 A1* | 9/2010 | Barreto | ............... | H04L 65/756 |
| | | | | 709/231 |
| 2012/0008496 A1* | 1/2012 | Saavedra | .............. | H04L 45/123 |
| | | | | 370/231 |
| 2022/0286402 A1* | 9/2022 | Wang | .................... | H04L 47/283 |

OTHER PUBLICATIONS

Non-Published Commonly Owned Related U.S. Appl. No. 18/214,475 with similar specification, filed Jun. 26, 2023, 45 pages, VMware, Inc.

* cited by examiner

```
static int compute_bw (struct cc_var *ccv,
   uint64 *bw) {
newreno *dt = ccv->cc_data;
struct timeval currTime ;
uint64 timeDiffUs ;
getmicrotime(&currTime);
timeDiffUs = getTimeDiffUs(&currTime , &dt ->
   lastTime);

if (timeDiffUs > 0) {
    uint64 result = 1000000;
    tcp_seq d = ccv->curack - dt ->lastAck;
    result *= d;
    result /= t imeDiffUs;
    *bw = result;
    dt->lastAck = ccv->curack;
    dt->lastTime = currTime;
    dt->sndBw = *bw;
    return 1;
  }
  return 0;
}
```

*Figure 2*

```
struct cc_algo {
   char    name [TCP CA NAME MAX];
   int     (*mod_init) (void);
   int     (*mod_destroy) (void);
   int     (*cb_init) (struct cc_var *ccv);
   void    (*cb_destroy) (struct cc_var *ccv);
   void    (*conn_init) (struct cc_var *ccv) ;
   void    (*ack_received) (struct cc_var *ccv,
      uint16_t type) ;
   void    (*cong_signal) (struct cc_var *ccv,
      uint32_t type ) ;
   void    (*post_recovery ) (struct cc_var *ccv);
   void    (*after_idle) (struct cc_var *ccv);
   };
```

*Figure 3*

```
if (CONGESTION AVOIDANCE) {
   incre = max ((MSS * MSS / cwnd), 1);
} elseif (SLOW START) {
   incre = Bytes_This_ACK;
}
if (bw > threshold ) {
   incre = max (1 , incre * scale_down );
}
cwnd += incre;
```

*Figure 6*

```
if (bw > threshold) {
   win = max (cwnd / 2 / scale_up , 2*MSS);
} switch (congestion_event) {
   case CC_NDUPACK:
      ssthresh = win;
      break;
   case CC_ECN:
      ssthresh = win;
      cwnd = win;
}
```

*Figure 7*

BANDWIDTH UTILIZATION-BASED CONGESTION CONTROL

BACKGROUND

Today, not all TCP traffic flows are born equal. Some have statically higher priority over others, while some have dynamically changing priorities over their lifecycle. Existing solutions such as traffic shaping on standard switches or port groups or traffic throttling have their limitations, such as lack of availability for certain licenses, and/or an inability to dynamically adjust TCP traffic priority.

BRIEF SUMMARY

Some embodiments of the invention provide a method for performing congestion control for a packet flow associated with a source host computer that operates in a network. The method is performed, in some embodiments, by the transport layer of the networking stack operating in the source host computer's OS (operating system). The source host computer, in some embodiments, is a host computer that executes one or more VMs. In other embodiments, the source host computer is a physical host computer.

At the source host computer, the method determines a bandwidth threshold (or target bandwidth) specified for the packet flow and uses the bandwidth threshold to define a maximum window size for a congestion control window that determines an amount of bandwidth allocated to the particular packet flow. In some embodiments, the packet flow is associated with a particular application, and the bandwidth threshold is determined based on a predetermined bandwidth threshold provided by the particular application. The bandwidth threshold, in some embodiments, is provided to the transport layer of the networking stack by the application layer of the networking stack.

The method periodically receives sets of contextual data (e.g., from the application layer of the networking stack) associated with the packet flow. In some embodiments, the received contextual data also includes contextual data associated with other flows processed by the source first host computer. For the received sets of contextual data, the method iteratively (1) computes a current bandwidth consumption by the packet flow, and (2) based on the sets of contextual data and the current bandwidth consumption, adjusts the amount of bandwidth allocated to the packet flow. In some embodiments, the bandwidth consumption is computed by measuring a rate of a connection for the packet flow by monitoring a rate of returning acknowledgements from a destination of the packet flow.

In some embodiments, the congestion window controls bandwidth allocation by controlling an amount of data sent by the source host computer as part of the packet flow before receiving an acknowledgement from a destination of the packet flow. Adjusting the congestion window size, in some embodiments, corresponds to adjusting a priority level of the packet flow. For example, in some embodiments, a larger congestion window is associated with a higher priority level and a greater amount of allocated bandwidth, while a smaller congestion window is associated with a lower priority level and a lesser amount of allocated bandwidth.

The determined bandwidth threshold of some embodiments is a first threshold, and when the size of the congestion window is greater than the first threshold during a first time period, the transport layer enters a congestion avoidance mode, and the size of the congestion window is increased at a first rate during the congestion avoidance mode. In some such embodiments, during the congestion avoidance mode, when the size of the congestion window is greater than a second threshold specified for bandwidth consumption during a second time period, the size of the congestion window is increased at a second rate that is slower than the first rate.

When congestion is detected, some embodiments enter a congestion recovery mode, and the size of the congestion window during the congestion recovery mode is set to half of a current size of the congestion window. During the congestion recovery mode, in some embodiments, when the computed bandwidth consumption reaches a third threshold, the size of the congestion window size is decreased at a third rate that is faster than the first rate and the second rate.

The packet flow, in some embodiments, is a machine migration packet flow for migrating a machine (e.g., a VM) from the source first host computer to a destination second host computer. In some embodiments, the machine migration packet flow includes a set of stages, and each set of contextual data includes an indication of the phase of the machine migration flow. The transport layer, in some embodiments, adjusts the amount of bandwidth allocated to the packet flow based on the indicated machine migration phase of the packet flow.

For example, machine migration flows of some embodiments include a pre-copy phase and a switchover phase that is more critical than the pre-copy phase, and the bandwidth allocation is increased during the switchover phase to ensure the flow is able to run to completion without experiencing any network issues, such as packet loss. In addition to avoiding network issues like packet loss, the increased allocation of networking resources (i.e., bandwidth) effectively shortens the switchover phase of the machine migration flow, in some embodiments. Shortening the switchover phase is beneficial, in some embodiments, because the VM is effectively stunned and unable to perform any meaningful operations during the switchover phase, and as such, the shorter the switchover phase, the quicker the VM can be resumed on its destination host.

Some embodiments of the invention also provide a method for performing congestion control for multiple packet flows traversing a network that includes multiple machines (e.g., multiple machines executing on multiple host computers). The method is performed, in some embodiments, by a distributed bandwidth utilization manager (DBUM) that manages bandwidth utilization in the network and is part of a management plane of the network. The DBUM receives state data associated with the multiple packet flows from the multiple machines in the network. The DBUM determines (1) that state data associated with a subset of the multiple packet flows indicates the subset of packet flows have run to completion and (2) that a particular packet flow of the multiple packet flows should receive more bandwidth. Based on said determining, the DBUM directs a source host computer of the particular packet flow to increase an amount of bandwidth allocated to the particular packet flow.

In some embodiments, agents are deployed to each host in the network, and each agent periodically distributes state data to each other agent on each other host in the network in order to provide each host with a full view of all packet flows on the network. The periodically received state data is used by each host in conjunction with periodically collected contextual data on the host to adjust bandwidth allocation for packet flows originating from the host. In other embodiments, the agents provide the state data to a centralized DBUM that aggregates the received state data and distributes the aggregated state data to each host to provide each host with a global view of all packet flows on the network.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, the Detailed Description, the Drawings, and the Claims is needed. Moreover, the claimed subject matters are not to be limited by the illustrative details in the Summary, the Detailed Description, and the Drawings.

BRIEF DESCRIPTION OF FIGURES

The novel features of the invention are set forth in the appended claims. However, for purposes of explanation, several embodiments of the invention are set forth in the following figures.

FIG. 2 illustrates an example of the code used to compute bandwidth, in some embodiments.

FIG. 3 illustrates a set of members in a struct cc algo of some embodiments.

FIG. 6 illustrates pseudo code for performing congestion window adjustments during congestion avoidance, in some embodiments.

FIG. 7 illustrates pseudo code for performing congestion window adjustments during congestion recovery, in some embodiments.

DETAILED DESCRIPTION

Figure 1:
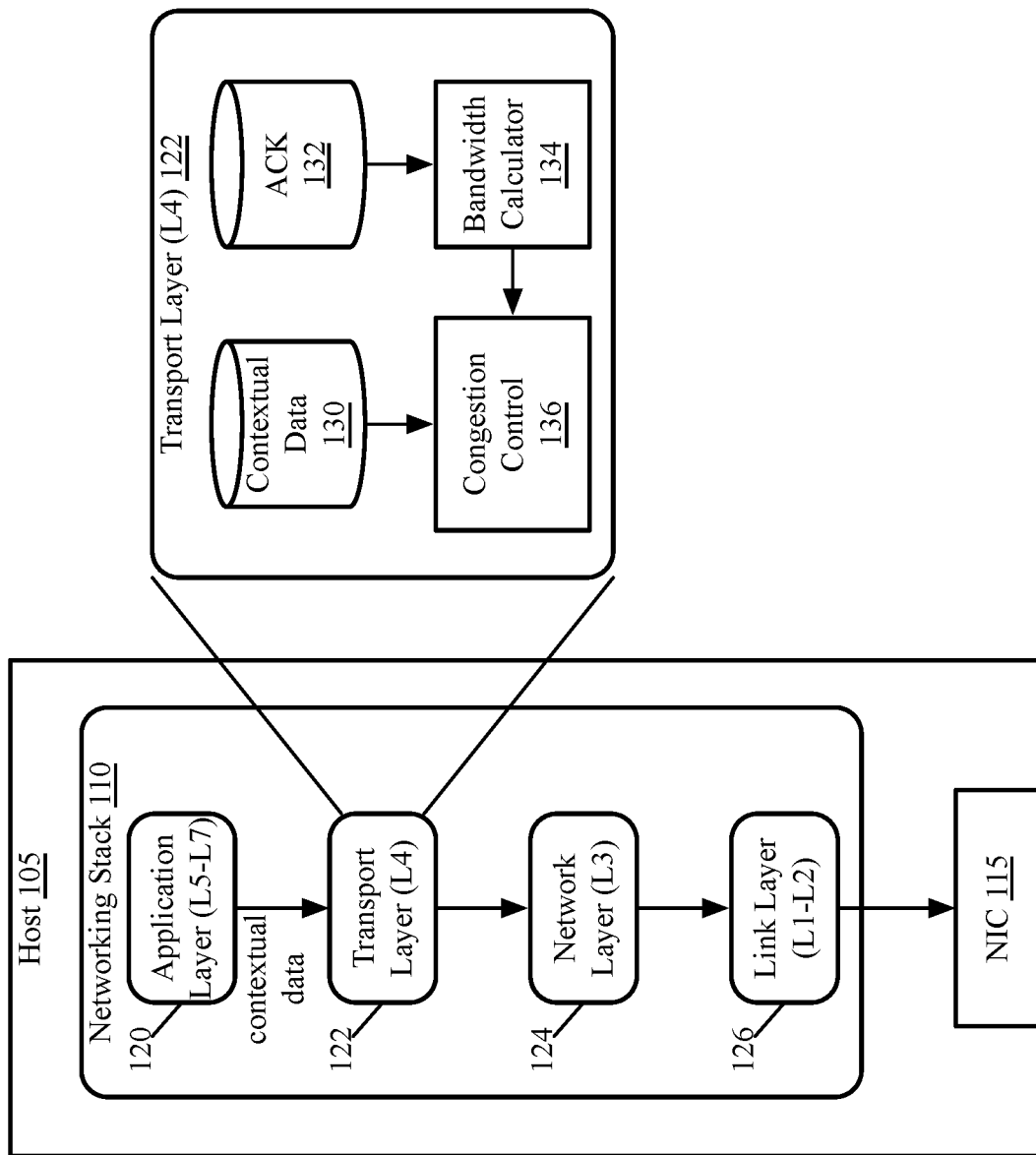
FIG. 1 conceptually illustrates a block diagram that includes networking stack for an application of some embodiments and the processes run by the transport layer of the networking stack (e.g., operating in the OS of the application's host computer).

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a method for performing congestion control for a packet flow associated with a source host computer that operates in a network. The method is performed, in some embodiments, by the transport layer of the networking stack operating in the source host computer's OS (operating system). The source host computer, in some embodiments, is a physical host computer that executes one or more VMs. In other embodiments, the source machine is a physical host computer. In some embodiments, the invention is applicable to any entity that understands TCP/IP.

At the source host computer, the method determines a bandwidth threshold (or target bandwidth) specified for the packet flow and uses the bandwidth threshold to define a maximum window size for a congestion control window that determines an amount of bandwidth allocated to the particular packet flow. In some embodiments, the packet flow is associated with a particular application, and the bandwidth threshold is determined based on a predetermined bandwidth threshold provided by the particular application. The bandwidth threshold, in some embodiments, is provided to the transport layer of the networking stack by the application layer of the networking stack.

The method periodically receives sets of contextual data associated with the packet flow. In some embodiments, a flow's contextual data is data that is associated with a flow and is data other than layers 2, 3 and 4 header values of the flow. The contextual data for a flow includes in some embodiments application layer (L7 layer) data (from the networking stack) that is associated with the flow. In some embodiments, the received contextual data also includes contextual data associated with other flows processed by the source first host computer.

For the received sets of contextual data, the method iteratively (1) computes a current bandwidth consumption by the packet flow, and (2) based on the sets of contextual data and the current bandwidth consumption, adjusts the amount of bandwidth allocated to the packet flow. In some embodiments, the bandwidth consumption is computed by measuring a rate of a connection for the packet flow by monitoring a rate of returning acknowledgements from a destination of the packet flow. The contextual data, in some embodiments, is used to determine when to apply a policy that is used to determine the bandwidth threshold. Also, in some embodiments, the bandwidth threshold is received with the contextual data from the application layer.

In some embodiments, the congestion window controls bandwidth allocation by controlling an amount of data sent by the source host computer as part of the packet flow before receiving an acknowledgement from a destination of the packet flow. Adjusting the congestion window size, in some embodiments, corresponds to adjusting a priority level of the packet flow. For example, in some embodiments, a larger congestion window is associated with a higher priority level and a greater amount of allocated bandwidth, while a smaller congestion window is associated with a lower priority level and a lesser amount of allocated bandwidth.

The determined bandwidth threshold of some embodiments is a first threshold, and when the size of the congestion window is greater than the first threshold during a first time period, the transport layer enters a congestion avoidance mode, and the size of the congestion window is increased at a first rate during the congestion avoidance mode. In some such embodiments, during the congestion avoidance mode, when the size of the congestion window is greater than a second threshold specified for bandwidth consumption during a second time period, the size of the congestion window is increased at a second rate that is slower than the first rate.

When congestion is detected, some embodiments enter a congestion recovery mode, and the size of the congestion window during the congestion recovery mode is set to half of a current size of the congestion window. During the congestion recovery mode, in some embodiments, when the computed bandwidth consumption reaches a third threshold, the size of the congestion window size is decreased at a third rate that is faster than the first rate and the second rate.

The packet flow, in some embodiments, is a machine migration packet flow for migrating a machine (e.g., a VM) from the source first host computer to a destination second host computer. In some embodiments, the machine migration packet flow includes a set of stages, and each set of contextual data includes an indication of the phase of the machine migration flow. The transport layer, in some embodiments, adjusts the amount of bandwidth allocated to the packet flow based on the indicated machine migration phase of the packet flow. For example, machine migration flows of some embodiments include a pre-copy phase and a switchover phase that is more critical than the pre-copy phase, and the bandwidth allocation is increased during the switchover phase to ensure the flow is able to run to completion without experiencing any network issues, such as packet loss.

Some embodiments of the invention also provide a method for performing congestion control for multiple packet flows traversing a network that includes multiple machines (e.g., multiple machines executing on multiple host computers). The method is performed, in some embodiments, by a distributed network manager that manages network bandwidth utilization. For each packet flow traversing the network, the method assigns a flow type from a set of two or more flow types to the packet flow. After a particular time period, the method determines (1) that a subset of packet flows of a first flow type have run to completion and (2) that a particular packet flow of a second flow type should receive more bandwidth. Based on the determination, the method directs a source host computer of the particular packet flow to increase an amount bandwidth allocated to the particular packet flow.

In some embodiments, an agent is deployed to each host in the network, and each agent periodically collects the contextual data and bandwidth utilization data used by the transport layers of the networking stacks, and periodically distributes this contextual data and bandwidth utilization data to each other agent on each other host in the network to provide each host with a full view of all flows in the network. In some embodiments, these agents operate in conjunction with the DBUM described above, while in other embodiments, these agents operate alternatively to the DBUM. The transport layers of each host then use the received contextual data and bandwidth utilization data from other hosts, as well as the host's own contextual data, bandwidth utilization data, and maximum congestion window size for a flow to adjust the congestion window (e.g., by increasing or decreasing the window size and/or increasing or decreasing the rate of increase/decrease of the window size).

The congestion control window, in some embodiments, is a TCP congestion control window that is maintained by the source of the packet flow and enables the source (e.g., via a TCP congestion control algorithm) to manage the number of bytes sent out on the network for a given flow. As a result, the source of a flow can use the congestion control window to prevent a link between the source and destination from becoming overloaded with too much traffic. In some embodiments, a bandwidth threshold, or target bandwidth, specified for a particular packet flow is used to set a maximum window size for the congestion control window. Both the bandwidth threshold (or target bandwidth) and the maximum window size can be adjusted during the lifecycle of the packet flow (e.g., by a network administrator).

In some embodiments, during the lifecycle of a packet flow, the TCP congestion window size increases and decreases according to a TCP congestion control algorithm used. As will be described in the embodiments below, some embodiments of the invention provide additive means (i.e., as opposed to a new congestion control algorithm) for adjusting the size of the TCP congestion control window as well as the rate of increase or rate of decrease of the TCP congestion control window's size based on contextual data associated with the packet flow and other packet flows associated with the source of the packet flow, as well as contextual data associated with each other packet flow on the network (e.g., provided by other machines on the network and/or by a centralized bandwidth utilization manager).

FIG. 1 conceptually illustrates a block diagram 100 that includes a networking stack for an application of some embodiments and the processes run by the transport layer of the networking stack (e.g., operating in the OS of the application's host computer). As shown, the block diagram 100 includes a host 105 with a networking stack 110 and a NIC (network interface card) 115. The networking stack 110 includes an application layer 120, a transport layer 122, a network layer 124, and a link layer 126.

The application layer 120 is the top-most layer of the networking stack 110 sitting at layer 7 (L7), and is the first layer of the network stack 110 to process packets sent by the host 105. The application layer 120 combines functionalities of the session layer (layer 6 (L6)) and the presentation layer (layer 5 (L5)) of the OSI (open systems interconnection) model. Functions of the application layer 120 include standardizing communications and formatting packets so that they can be further processed by subsequent layers of the networking stack 110, providing a communications interface between application processes of the host 105 and the subsequent layers of the networking stack 110, and allowing users to interact with applications. Additionally, the application layer 120 provides contextual data about applications, such as a bandwidth threshold or target bandwidth specified for an application flow (e.g., existing flow or new flow) associated with an application, to the transport layer 122. The contextual data, in some embodiments, includes data other than L2-L4 header values of a flow (e.g., L7 data).

The protocol used by the application layer 120 is specific to a particular type of application. Examples of the main protocols used by the application layer 120 include HTTP (hypertext transfer protocol), FTP (file transfer protocol), SMTP (simple mail transfer protocol), DNS (domain name system), TELNET, and SNMP (simple network management protocol). Communications between application layers of different hosts are forwarded to the transport layer.

Applications, in some embodiments, are computer programs such as software applications that are configured to perform specific tasks. These tasks include one or more of the manipulation of text, numbers, audio, graphics, as well as any tasks other than those related to the operations of a computer. Examples of applications, in some embodiments, include word-processing applications, web browsers, image editors, database programs, deployment tools, communications platforms, multimedia applications, email programs, etc.

The transport layer 122 receives data from the application layer 120, and packetizes the data and adds sequencing and error correction information to each packet. The network layer 124 adds the source and destination IP addresses to each packet, while the link layer 126 adds source and destination MAC addresses to each packet. After adding the MAC addresses, the link layer 126 passes the packets to the NIC 115 for forwarding onto the network (e.g., to a next-hop router).

In addition to packetizing data and adding sequencing and error correction information to packets, the transport layer 122 of some embodiments also performs processes in relation to congestion control. As shown, the transport layer 122 includes a contextual data storage 130, an acknowledgement storage 132, a bandwidth calculator 134, and a congestion control process 136.

In some embodiments, as the application layer 120 collects contextual data from applications, the application layer 120 provides this contextual data to the transport layer 122, as mentioned above, which is then stored in the contextual data storage 130. The contextual data, in some embodiments, includes information such as the current phase of a particular packet flow associated with an application, bandwidth threshold or target bandwidth specified for a particular packet flow, and flow type. As mentioned above, the contextual data of some embodiments includes data that is associated with the flow and that is data other than L2-L4 header values of the flow (e.g., L7 data).

For example, in the case of virtual machine (VM) migration, each migration flow goes through a set of phases, such as the pre-copy phase and the switchover phase. Additionally, the contextual data of some embodiments includes information such as a target bandwidth (or bandwidth threshold) specified for the flow, a flow type associated with the flow, and a start time of the flow (e.g., a timestamp indicating the start time of the flow). The flow types, in some embodiments, include flows such as VOIP (voice over IP) flows, video conference flows, file transfer flows, etc.

In some embodiments, it is critical to obtain accurate bandwidth for bandwidth-based congestion control to properly function. Bandwidth is computed, in some embodiments, using cc_var.curack field that represents the most recent acknowledgement received by a sender. In the case of the new reno congestion control algorithm, every time newreno_ack_received callback is invoked, in some embodiments, the current time and the current value of the cc_var.curack are stored in the acknowledgement storage 132. This information is retrieved and used by the bandwidth calculator 134 to calculate the bandwidth when newreno_ack_received callback is invoked again, according to some embodiments. The code for bandwidth computation of some embodiments is illustrated by FIG. 2.

The congestion control process 136 manages congestion control for packet flows for the application. In some embodiments, the congestion control process 136 uses various information such as contextual data from the contextual data storage 130 and bandwidth utilization measurements from the bandwidth calculator 134. The congestion control process 136 of some embodiments uses the contextual data, such as target bandwidth for the application and indicated phase of a packet flow for the application, and bandwidth utilization measurements to adjust a TCP congestion control window and adapt to any detected congestion.

For instance, as mentioned above, certain packet flows, such as VM migration flows, go through a set of phases during a single TCP connection session. VM migration flows, in some embodiments, include a pre-copy phase and a switchover phase. During the pre-copy phase of some embodiments, the source virtualization software copies all memory pages from the source host to the destination host while the VM is still running on the source host. During the switchover phase, the VM is suspended on the source host and resumed on the destination host. The pre-copy phase, in some embodiments, is less critical than the switchover phase, and as such, has a lower priority and is allocated less bandwidth than the switchover phase, according to some embodiments.

In some embodiments, the networking stack 110 (e.g., VMware, Inc.'s networking stack) uses an implementation of an open-source operating system (OS) (e.g., FreeBSD), which provides a set of hook functions encapsulated in a struct cc algo, with a set of members as illustrated by FIG. 3. In particular, an ack_received function is called when a TCP acknowledgement (ACK) packet is received, as also mentioned above, and a cong_signal function is called when a congestion event is detected by the TCP stack 110, according to some embodiments. These two functions, in some embodiments, define the congestion control behavior of TCP New Reno. In some embodiments, behavior is modified based on a predefined bandwidth threshold.

Figure 4:
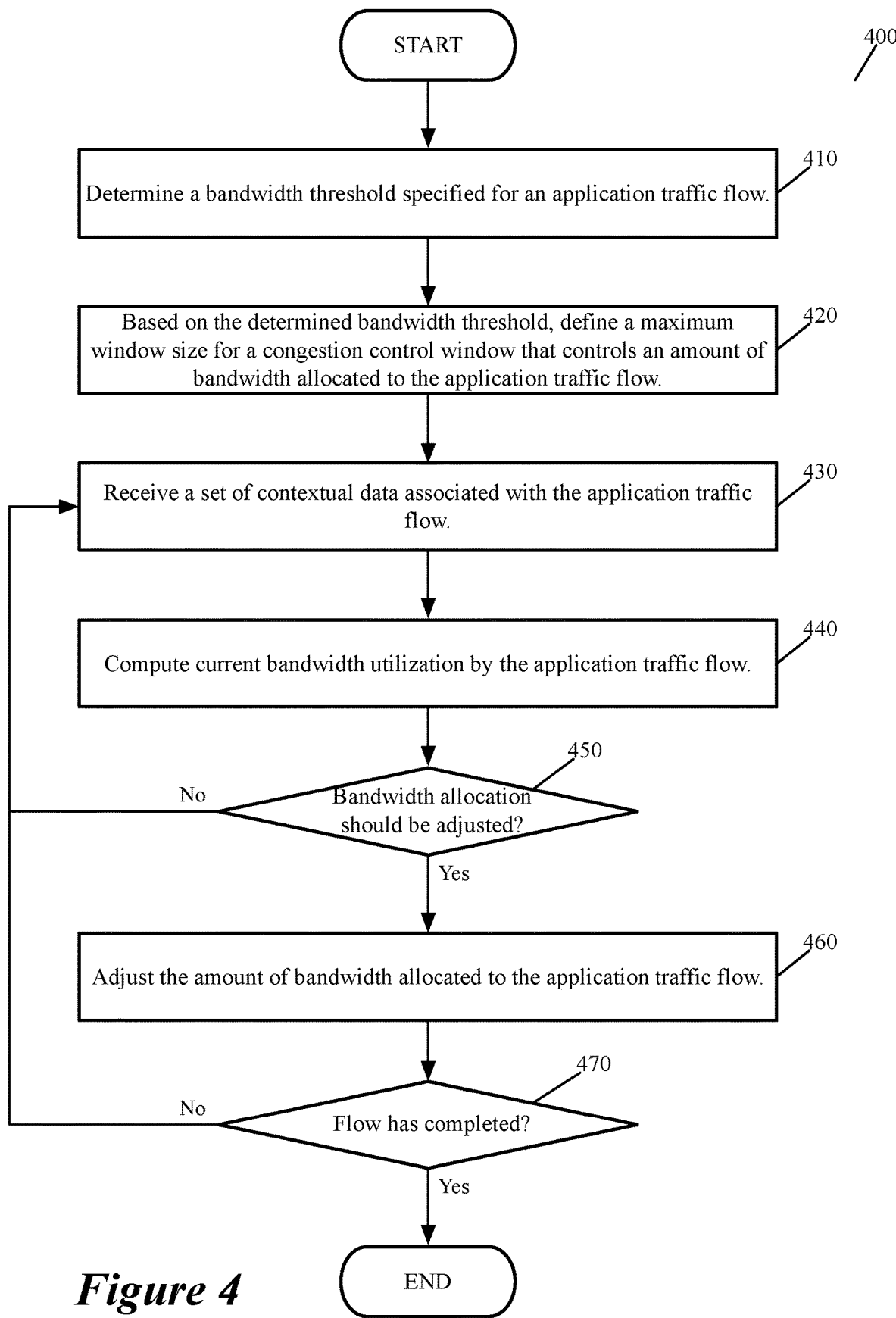
FIG. 4 conceptually illustrates a process performed in some embodiments to dynamically adjust bandwidth allocation to an application traffic flow based on contextual data associated with the application traffic flow and current bandwidth utilization by the application traffic flow.

FIG. 4 conceptually illustrates a process 400 performed in some embodiments to dynamically adjust bandwidth allocation to an active application traffic flow based on contextual data associated with the application traffic flow and current bandwidth utilization by the application traffic flow. The process 400 is performed, in some embodiments, by the transport layer of networking stack residing in the operating system (OS) of a host (e.g., transport layer 122 of the networking stack 110).

The process 400 starts by determining (at 410) a bandwidth threshold specified for an application traffic flow. The bandwidth threshold, in some embodiments, is a pre-defined bandwidth threshold received from the application associated with the application traffic flow. For example, the bandwidth threshold for an application, in some embodiments, is set at 1 Gbps (1 gigabit per second). The transport layer determines the bandwidth threshold by receiving the bandwidth threshold from the application layer of the networking stack.

For example, as described above, the application layer 120 of the networking stack 110 on the host 105 provides a bandwidth threshold (or target bandwidth) to the transport layer 122. In some embodiments, the bandwidth threshold is received with the contextual data from the application layer of the networking stack. In other embodiments, the bandwidth threshold is determined by a policy, and the contextual data is used to determine when to apply the policy.

Based on the determined bandwidth threshold, the process 400 defines (at 420) a maximum window size for a congestion control window that controls an amount of bandwidth allocated to the application traffic flow. More specifically, the congestion window determines the number of bytes on the network (i.e., the amount of data that a source can send before receiving an acknowledgement from the destination), in some embodiments. For instance, the smaller the congestion window, the less amount of data allowed to be sent on the network. As such, the maximum window size equates to the maximum amount of data that can be sent from the source to a destination.

The process 400 receives (at 430) a set of contextual data associated with the application traffic flow. The contextual data received, in some embodiments, is received from the application layer of the networking stack (e.g., application layer 120 of the networking stack 110) as described above. The application layer periodically provides contextual data to the transport layer (e.g., as the application layer processes packets and collects contextual data), in some embodiments.

In some embodiments, the contextual data includes information such as the target bandwidth or bandwidth threshold specified for the flow, a flow type associated with the flow, and, when applicable, a phase of the flow. The contextual data, in some embodiments, includes contextual data associated with each of multiple flows that traverse the source of the application traffic flow (e.g., other application traffic flows originating from the source, destined to the source, or otherwise processed by the source) to enable the transport layer to account for all flows known to the source.

The contextual data of some embodiments includes the phase of the flow for certain flows that go through a set of phases during their lifecycle. For example, when the application traffic flow is a VM migration flow, the contextual data of some embodiments specifies whether the VM migration flow is in the guest trace phase (e.g., preparing the VM for live migration by transferring memory from the source host to the destination host), the pre-copy phase (e.g., iteratively copying the VM memory from the source host to the destination host), or the switchover phase (e.g., pausing the VM on the source host and resuming the VM on the destination host). In some embodiments, the guest trace phase is included as part of the pre-copy phase, and as such, the indicated phase is either pre-copy, or switchover.

The process 400 computes (at 440) current bandwidth utilization by the application traffic flow. As described above and illustrated by FIG. 2, bandwidth is computed, in some embodiments, using a field (i.e., cc_var.curack) that represents the most recent acknowledgement received by a sender. The current time and current value of that field, cc_var.curack, is stored (e.g., in an acknowledgement storage 132), in some embodiments, every time a particular callback associated with received of acknowledgement (e.g., newreno_ack_received callback) is invoked. A bandwidth calculator, or other bandwidth calculation process, retrieves these values from the acknowledgement storage, in some embodiments, and uses the data to calculate the bandwidth.

The process 400 then determines (at 450) whether the bandwidth amount allocated to the application traffic flow should be adjusted. This adjustment, in some embodiments, is an adjustment to the TCP congestion window size, as well as an adjustment to a rate at which the TCP congestion window is increased or decreased. That is, when an algorithm used for TCP congestion control is in a phase that is supposed to increase the TCP congestion window size, the increase can be scaled down (i.e., increased slower), whereas when the algorithm is in a phase that is supposed to decrease the TCP congestion window size, the decrease is scaled up (i.e., decreased faster).

For instance, if the amount of data on the network that has not yet reached the destination (i.e., the amount of bandwidth being utilized by the data on the network) has reached or exceeded the bandwidth threshold, and the congestion window is in a mode during which its size is being increased, the rate of increase of the congestion window can be decreased (i.e., the size of the window can be increased more slowly). Alternatively, if the amount of data on the network that has not yet reached the destination is well below the threshold, and the TCP congestion window is in a mode where its size is being increased, the rate of increase of the TCP congestion window size can be increased (i.e., the size of the window can be increased faster). Similarly, if the TCP congestion window is in a mode during which its size is being decreased, the rate of decrease can be increased (i.e., the window will get smaller faster) or decreased (i.e., the window will get smaller more slowly).

When the process 400 determines that the bandwidth allocation should not be adjusted, the process 400 returns to receive (at 430) contextual data associated with the application traffic flow (and other flows processed by the source). Otherwise, when the process 400 determines that bandwidth allocation should be adjusted, the process 400 transitions to adjust (at 460) the amount of bandwidth allocated to the application traffic flow.

The bandwidth adjustment can be an increase of allocated bandwidth or a decrease of allocated bandwidth. As mentioned above, bandwidth allocation amounts are increased (e.g., via an increase of the TCP congestion window size), in some embodiments, when the amount of data on the network has not reached the bandwidth threshold, and are decreased (e.g., via a decrease of the TCP congestion window size), in some embodiments, when the amount of data on the network has reached/exceeded the threshold. Additionally, the adjustment in some embodiments includes adjusting the rate (i.e., how fast, or how slow) the window size is increased or decreased.

The process 400 next determines (at 470) whether the application traffic flow has run to completion. That is, the process determines whether the TCP connection for the application traffic flow has been terminated. When the application traffic flow has not yet run to completion, the process 400 returns to receive (at 430) contextual data associated with the application traffic flow. Otherwise, when the application traffic flow has run to completion, the process 400 ends.

Figure 5:
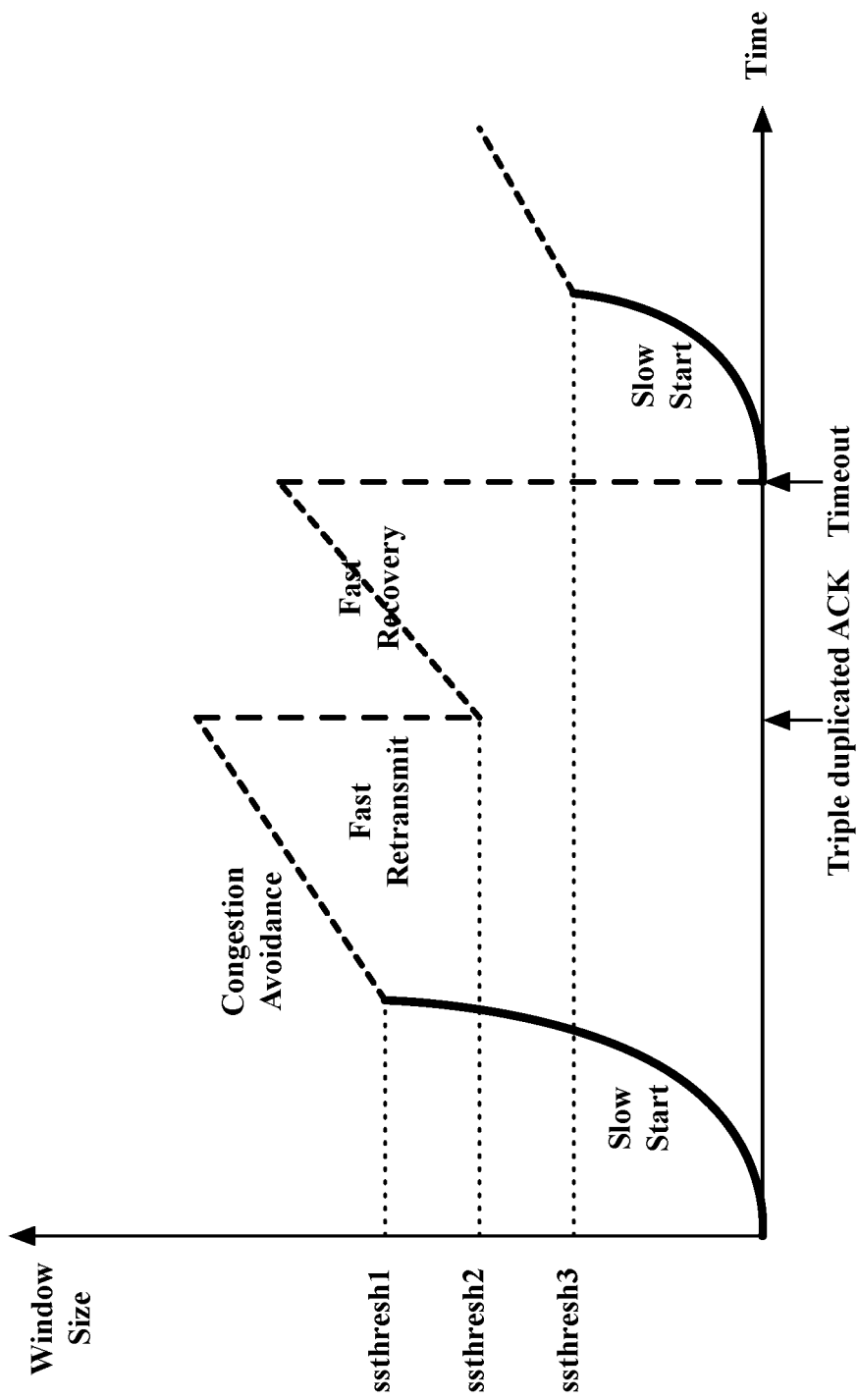
FIG. 5 illustrates a TCP congestion control window of some embodiments as TCP's congestion control adjusts the window size to adapt to congestion.

FIG. 5 illustrates a TCP congestion control window 500 of some embodiments as TCP's congestion control (e.g., congestion control process 136) adjusts the window size to adapt to congestion. As described above, the TCP congestion window of some embodiments controls the amount of bandwidth allocated to a given flow by controlling the amount of data that can be sent on the network as part of the given flow before an acknowledgement is received from the destination of the flow. As such, the sender side, in some embodiments, manages the congestion window (CWND) to decide the number of bytes out in the network. More precisely, in some embodiments, this represents the number of data that TCP can send before receiving an ACK.

In some embodiments, the TCP new reno algorithm slowly increases the CWND window size if no congestion event occurs. In some embodiments, this is done based on the theory that maximum available throughput may not yet have been reached. This CWND increase stage, commonly known as additive increase in some embodiments, can be further divided into slow start and congestion avoidance stages.

Slow Start, in some embodiments, begins with an initial value of one Maximum Segment Size (MSS). In some embodiments, the congestion window size is increased by one MSS for each acknowledgement received, effectively doubling the window size each RTT. At the slow start stage, CWND increases in an exponential way until it reaches ssthresh (slow start threshold) or when congestion is detected, in some embodiments. When CWND is greater than ssthresh, the sender goes into congestion avoidance mode.

During the congestion avoidance stage, CWND increases by MSS*MSS/CWND per ACK, in some embodiments, which is approximately linearly increasing CWND by one MSS per RTT. Congestion avoidance continues until congestion is detected, in some embodiments. The window size increase is adjusted, in some embodiments, at these two stages based on the traffic bandwidth. When the bandwidth reaches a threshold, the window size increase is scaled down, causing it to grow in a more conservative way (i.e., more slowly). Pseudo code is illustrated by FIG. 6.

When congestion is detected, in some embodiments, a hook function for the congestion event, newreno_cong_signal, is called, and the slow start threshold (i.e., ssthresh) and/or CWND is set to half of the current CWND size or two times the MSS, whichever is larger. In some embodiments, the algorithm is altered to adjust the ssthresh decrease based on traffic bandwidth. When the bandwidth reaches a threshold, some embodiments scale-up the window size decrease to cause it to shrink in a more aggressive way. Pseudo code is illustrated by FIG. 7.

During the post-recovery phase, the algorithm of some embodiments continues to run and make necessary estimations as before when an acknowledgement is received. In some embodiments, the scale up, scale down ratios and bandwidth threshold are made into configurable options for ease of testing. These configurable options, in some embodiments, are named CwndScaleUp, CwndScaleDown, and CwndBWThresh, which correspond to scale_up, scale_down, and threshold respectively in the pseudo code. For the sake of brevity, the original TCP New Reno is referred as newreno in the embodiments described below, while the adjusted TCP New Reno is referred to as newreno2.

In some embodiments, virtualization platforms (e.g., VMware, Inc.'s vSphere) have various networks and different traffic flows from the various networks. The VM network of some embodiments has various VM traffic flows. In some embodiments, vmkernel networks, such as Management, vMotion, provisioning, vSAN and NFS, have respective traffic flows. Apart from the vmkernel network flows, which dynamically change depending on what their associated VM or application intends to do, these traffic flows can be classified as elephant flows and mice flows, in some embodiments, depending on the data they move. The provisioning traffic flows of vMotion and NFC are elephant flows as they move large amounts of data, according to some embodiments. The storage network flows for vSAN and NFS, in some embodiments, also move large amounts of data. An additional example of an elephant flow is a data replication (i.e., back-up) flow for a VM's virtual disks. Conversely, the management network of some embodiments is mostly control traffic and does not move large amount of data.

Figure 8:
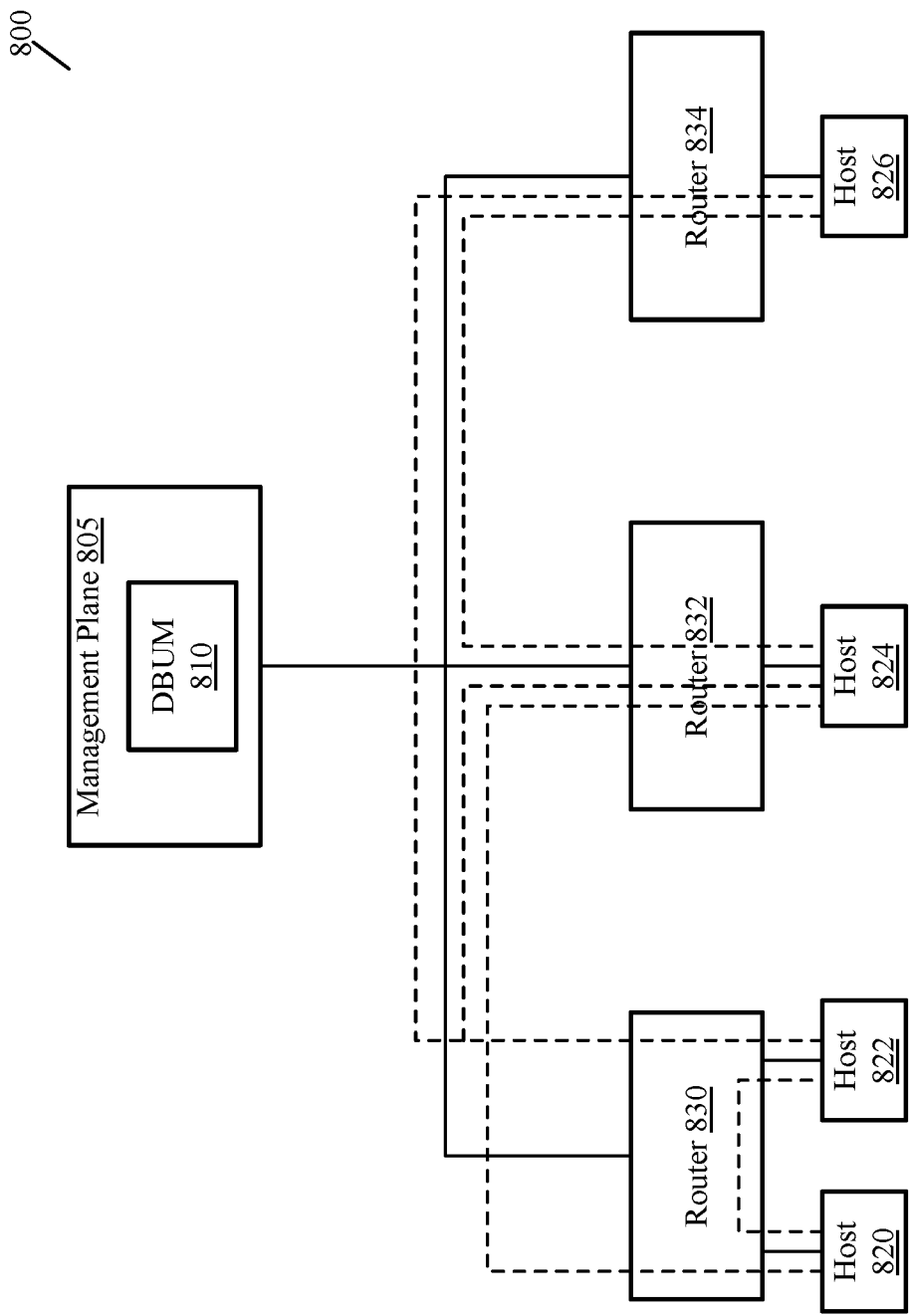
FIG. 8 conceptually illustrates a diagram of a network of some embodiments in which a distributed bandwidth utilization manager (DBUM) implemented in the management plane.

FIG. 8 conceptually illustrates a diagram of a network of some embodiments in which a distributed bandwidth utilization manager (DBUM) implemented in the management plane. As shown, the network 800 includes a network manager 805, routers 830-834, and multiple hosts 820-826. The hosts 820 and 822 connect to router 830, the host 824 connects to the router 832, and the host 826 connects to the router 834. Additionally, the network manager 805 includes a DBUM 810.

Because the DBUM 810 is part of the network manager 805, and thus is part of the management plane, in some embodiments, the DBUM 810 has visualization of all managed traffic flows between any of the hosts 820-826 that are directly or indirectly initiated by the network manager 805. In some embodiments, the DBUM 810 has visualization of other traffic flows not initiated by the network manager 805 based on state data received from the hosts 820-826. For example, in some embodiments, if a user independently logs into a particular host 820-826 and begins to generate TCP connections, the DBUM 810 is unaware of these connections unless and until the particular host 820-826 provides state data associated with any flows sent and received using the generated TCP connections to the DBUM 810. In some embodiments, local agents (not shown) deployed on the hosts 820-826 periodically provide state data associated with such flows to the DBUM 810 to provide the DBUM 810 with a full view of flows on the network.

The local agents (not shown) of some embodiments continuously communicate with the DBUM 810 regarding the statuses of managed flows that are still in progress (i.e., active flows). The DBUM 810, in some embodiments, provides dynamic directives to these local agents for implementation on their respective hosts based on the data (e.g., state data) provided by the local agents to the DBUM 810. The state data, in some embodiments, also includes contextual data and calculated bandwidth utilization used by the transport layers of the networking stacks of the hosts (e.g., transport layer 122 of the networking stack 110 on host 105). The contextual data, in some embodiments, includes information such as a flow type associated with the flow, a current phase of the flow, available bandwidth, and link speed. In some embodiments, information such as available bandwidth and link speed is provided to the DBUM 810 following configuration changes or hardware updates.

Using this cluster-wide or network-wide visibility, the DBUM 810 can prioritize traffic flows using the bandwidth utilization-based congestion control. In some embodiments, the flows that are to be prioritized are specified by a network administrator. For example, in some embodiments, certain traffic flows are prioritized such that low priority elephant flows, such as NFC (network file copy) traffic flows, yield to high priority elephant flows such as VM migration traffic flows, virtual storage network traffic flows, and NFS (network file system) traffic flows, and also yield to control traffic, such as management traffic between a network controller and one or more hosts.

In some embodiments, a network manager specifies prioritization rankings for different traffic flows. For instance, a network manager of some embodiments specifies a prioritization order from highest priority to lowest priority that includes management flows (i.e., highest priority), VM workload flows, storage flows, and VM migration flows (i.e., lowest priority). The rankings, in some embodiments, are dynamic and arbitrary and can be adjusted for specific system requirements, according to some embodiments.

In some embodiments, due to the visibility available to the DBUM 810, the DBUM 810 is similar to a Virtual Distributed Switch. Also, in some embodiments, the DBUM 810 receives information from a Virtual Distributed Switch, such as network I/O control information. A network management server aspect of the DBUM, in some embodiments, keeps track of elephant flows across the cluster. In some embodiments, it adds flows that are started as a result of new provisioning operations and removes the flows when the provisioning operations run to completion. The DBUM 810 instructs the hosts 820-826, in some embodiments, to apply bandwidth utilization-based congestion control dynamically to existing flows as new flows are started.

A host-aspect of the DBUM 810 of some embodiments has visibility across all the traffic flows that run on a given host 820-826. In some embodiments, the DBUM 810 can dynamically apply bandwidth utilization-based congestion control to existing or new flows depending on the completion of certain traffic flows or start of new traffic flows. For instance, when a group of flows run to completion, the DBUM 810 of some embodiments instructs one or more hosts 820-826 to increase bandwidth allocation (i.e., increase the size of the TCP congestion windows) for one or more new and/or existing flows. Additionally, in some embodiments, the DBUM 810 instructs one or more hosts 820-826 to increase or decrease bandwidth allocation for one or more flows originating from the hosts based on existing flows on the network entering different phases (e.g., decrease bandwidth for a flow on host 820 based on a VM migration flow from host 822 entering its switchover phase).

In some embodiments, DBUM 810 can be complementary to Network I/O control (NIOC) of a Virtual Distributed Switch. NIOC, in some embodiments, works at a port-group-level, while DBUM works within a port group to prioritize TCP flows. For example, it can prioritize NFC traffic of a live migration compared to NFC traffic for cloning, which all run on the same port group in VDS, in some embodiments.

A goal of DBUM 810, in some embodiments, is to have rack awareness while applying the bandwidth utilization based congestion control to flows. In some embodiments, DBUM 810 limits bandwidth to lower priority NFC flows that go across racks (i.e., as opposed to NFC flows within racks) to keep a limit on the traffic across racks. Doing so, in some embodiments, enables a higher bandwidth for higher priority flows (e.g., VM migration traffic flows or virtual storage network traffic flows) that go across the racks. The ability to dynamically change the priority of flows across racks enables high priority cross-rack operations to come to completion faster, in some embodiments. In another example, the DBUM 810 limits bandwidth to vmkernel network flows of migration and NFC across racks in order to enable the VM network to receive higher bandwidth, in some embodiments.

Figure 9:
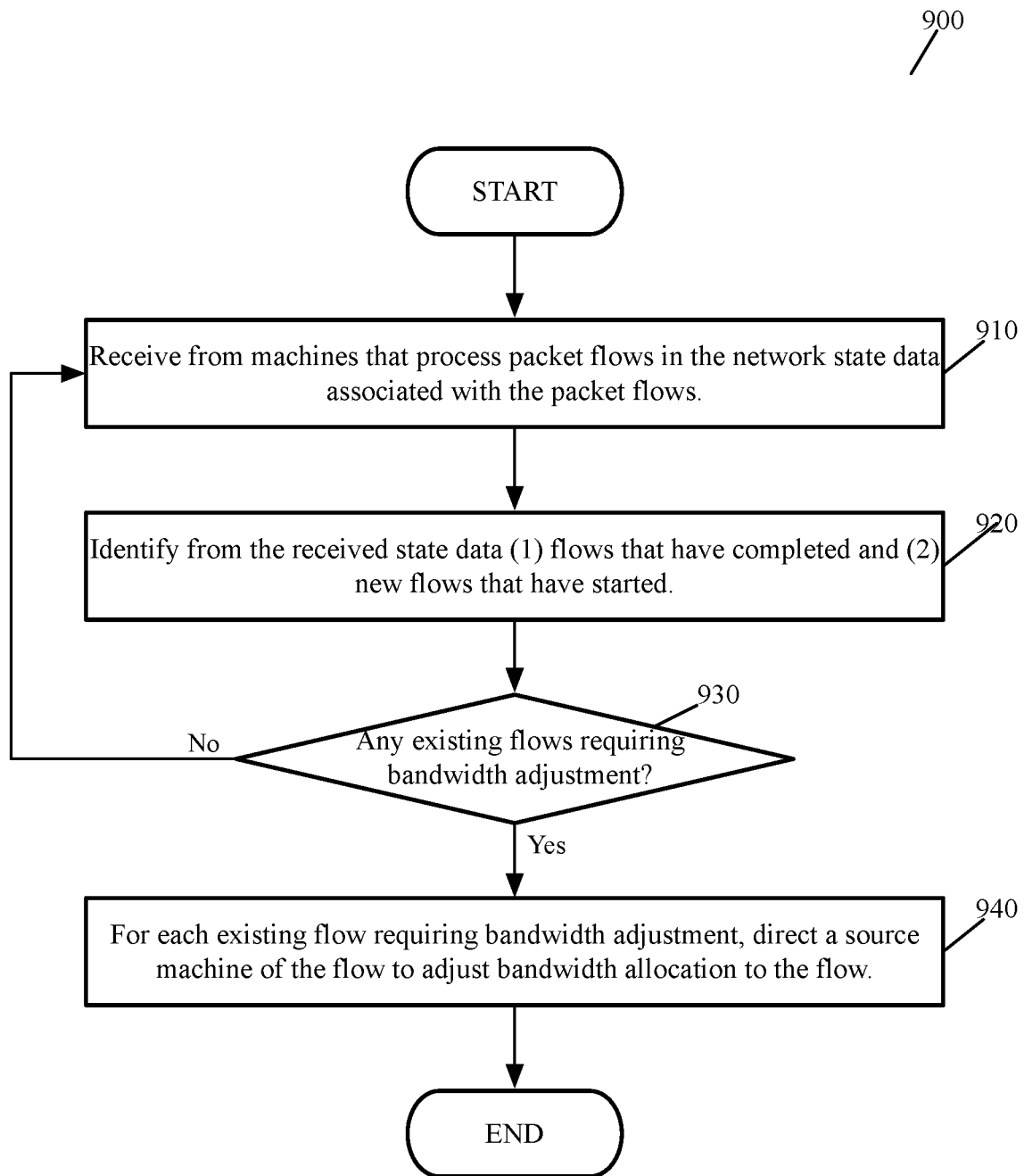
FIG. 9 conceptually illustrates a process performed by the DBUM of some embodiments to manage congestion control for a network.

FIG. 9 conceptually illustrates a process 900 performed by the DBUM of some embodiments to manage congestion control for a network. The process 900 will be described with references to FIG. 8. The process 900 starts when the DBUM receives (at 910), from machines that process packet flows in the network, state data associated with the packet flows. As described above, the DBUM is implemented as part of the management plane, according to some embodiments, and has network-wide visibility of all flows traversing the network.

In some embodiments, state data received by the DBUM includes states of the packet flows, such as whether a flow is in progress (i.e., active), or whether a flow has terminated (i.e., has run to completion and for which the connection has been terminated). The state data of some embodiments also includes contextual data associated with the flows, such as flow type and bandwidth utilization by the flows and computed by source hosts of the flows.

The state data is received, in some embodiments, from agents deployed to the hosts. For example, in some embodiments, agents deployed to each host collect state data and contextual data used by the transport layer of the networking stack of the host, and provide this data to the DBUM. The state data, and any other relevant data, provide the DBUM of some embodiments with network-wide visibility of all flows traversing the network, including when flows end, when new flows begin, etc. In some embodiments, the DBUM periodically receives state data from the hosts (i.e., from agents on the hosts) to provide the DBUM with a dynamic network-wide view of all the flows, and thereby enable the DBUM to make dynamic decisions based on current state data, and changes in state data.

The process 900 identifies (at 920) from the received state data (1) flows that have completed and (2) new flows that have started. As mentioned above, the state data is periodically received, in some embodiments, and thus provides the DBUM with a dynamic network-wide view of the flows. As such, the DBUM of some embodiments is able to determine what flows are currently active, including new flows, as well as what previously active flows have run to completion (i.e., are done and for which connections have been terminated). In some embodiments, the DBUM also identifies any flows that have entered a new phase within the lifecycle of the flow, as well as the flow types of the flows for which state data has been received. By identifying what flows have completed, started, entered new phases, etc., as well as the flows types of each flow, the DBUM of some embodiments is able to determine what flows should be prioritized on the network.

Examples of flow types, in some embodiments, include NFC traffic flows, VM migration traffic flows, virtual storage network traffic flows, NFS traffic flows, vmkernel network flows, and management traffic flows (e.g., control traffic). In some embodiments, the state data includes contextual data, as mentioned above. This contextual data, in some embodiments, includes flow types and, in some embodiments, the DBUM determines a priority level of a flow based on the identified flow type (e.g., by performing a lookup in a datastore that specifies priority levels associated with different flow types). As higher priority flows, in some embodiments, are allocated more bandwidth than lower priority flows, the DBUM can use the identified flow type to help prioritize higher priority flows and ensure these flows receive adequate bandwidth.

The process 900 determines (at 930) whether any existing flows require bandwidth adjustment. For example, in some embodiments, the DBUM uses the received state data to determine whether any flows on the network should receive more bandwidth, and whether any flows on the network should receive less bandwidth. That is, the DBUM of some embodiments dynamically applies bandwidth utilization-based congestion control to existing and/or new flows based on the state data. For instance, the DBUM of some embodiments can determine based on the state data that a subset of high priority flows (e.g., elephant flows) that required a large amount of bandwidth have run to completion, and thus additional bandwidth is available for allocation to a flow that has entered a critical phase in its lifecycle.

For each existing flow requiring bandwidth adjustment, the process 900 directs (at 940) a source host computer of the flow to adjust bandwidth allocation to the flow. The adjustments can include increases to bandwidth allocation or decreases to bandwidth allocation. In some embodiments, the source host computers adjust a bandwidth threshold that corresponds to a maximum window size of a congestion control window of the source host based on the bandwidth adjustment directed by the DBUM. Also, in some embodiments, the source host computers adjust a rate of increase or decrease of their congestion control windows to increase or decrease how quickly their congestion control windows increase in size or decrease in size.

As mentioned in examples above, certain flows, such as VM migration flows, go through a set of phases, with each phase having a different associated priority level. As such, in some embodiments, for example, the DBUM detects that a set of management flows have run to completion and, in response, sends a notification to a source host of a VM migration flow that is entering the critical switchover phase in order to instruct the source host to increase bandwidth allocation (i.e., increase congestion control window size), thereby giving the VM migration flow higher priority during the critical phase. Following 940, the process 900 ends.

Figure 10:
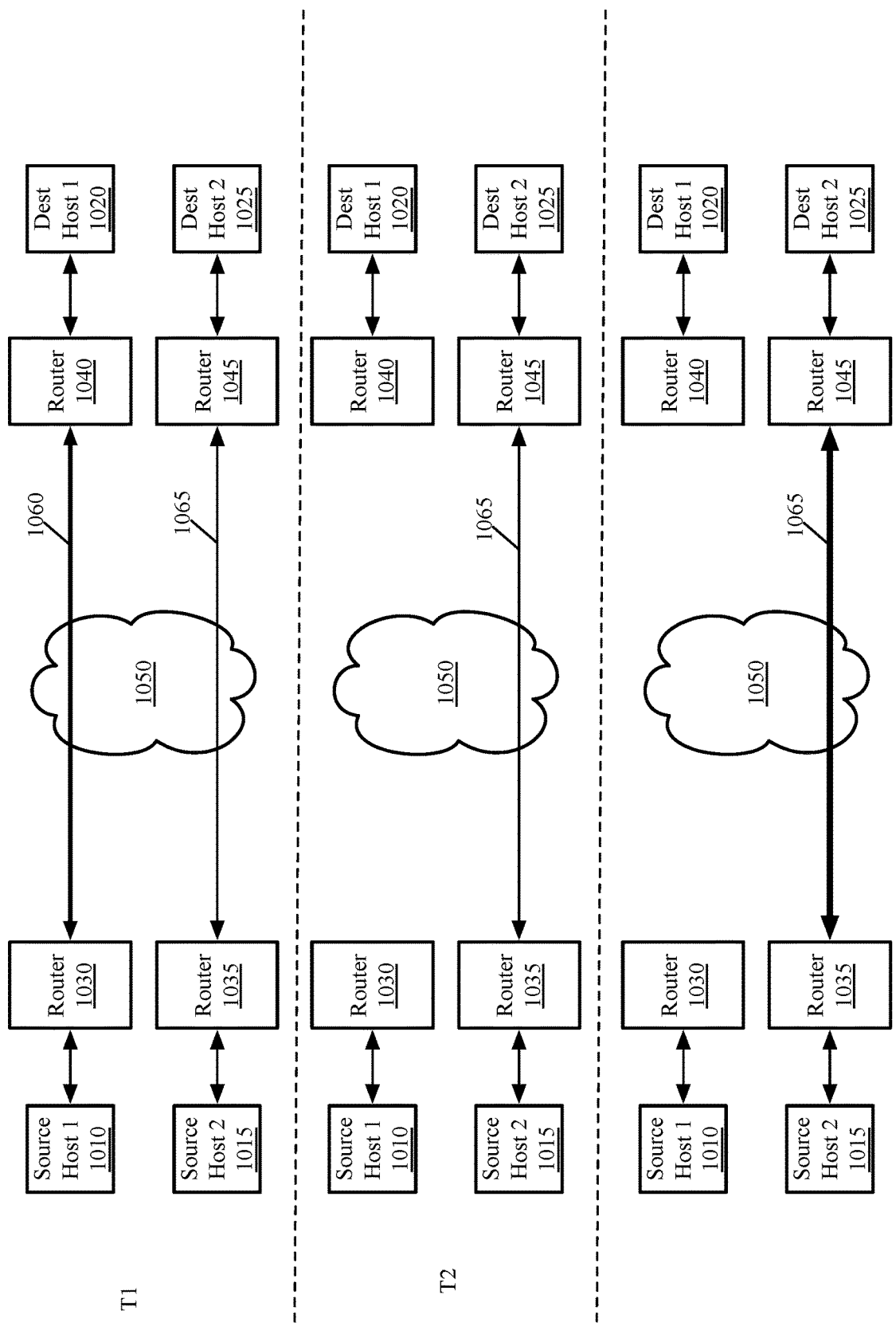
FIG. 10 illustrates an example of flows between two source hosts and two destination hosts of some embodiments at three different times.

FIG. 10 illustrates an example of flows between two source hosts and two destination hosts of some embodiments at three different times. As shown, at time T1, a first application traffic flow 1060 flows through a network 1050 between a source host 1010 connected to a router 1030 and a destination host 1020 connected to a router 1040, while a second application traffic flow 1065 flows through the network 1050 between a source host 1015 connected to a router 1035 and a destination host 1025 connected to a router 1045.

The network 1050, in some embodiments is an internal network (i.e., the traffic does not traverse any external networks). In other embodiments, the network 1050 is an intervening network that includes a private network, such as an MPLS (multiprotocol label switching) network, or includes one or more public networks, such as the Internet and/or one or more networks of one or more public clouds. In still other embodiments, the network is an intervening network that includes a combination of public and private networks (such as those mentioned above).

In this example, traffic flows illustrated with a thicker line are indicative of higher bandwidth utilization. Accordingly, the application traffic flow 1060 at time T1 utilizes more bandwidth than the application traffic flow 1065 at time T1. By time T2, the application traffic flow 1060 has run to completion, while the application traffic flow 1065 is still active. Because the application traffic flow 1060 is associated with source and destination hosts 1010 and 1020, the source host 1015 of the application traffic flow 1065 is not aware of the flow 1060 while it is active, nor when it runs to completion, without the assistance of the DBUM (not shown) described above.

With the assistance of the DBUM (not shown), the source host 1015 can adjust the bandwidth allocated to the application traffic flow 1065 based on current network conditions as directed by the DBUM. For example, the DBUM (not shown) can direct the source host 1015 to adjust bandwidth allocation to application traffic flow 1065 when the DBUM learns that the flow 1060 has completed (i.e., a connection facilitating the flow has been terminated. In other embodiments, as will be further described below, the source host 1015 receives remote state data from each other host, including hosts 1010, 1020, and 1025, and uses this remote state data in conjunction with local state data and/or local contextual data collected on source host 1015 to make determinations regarding bandwidth allocation for the flow 1065.

After receiving a notification from DBUM (not shown) directing the source host 1015 to adjust bandwidth allocation for the flow 1065 once the application traffic flow 1060 has run to completion, the source host 1015 increases or decreases the amount of bandwidth allocated to the application traffic flow 1065 as directed. In some embodiments, when the application traffic flow 1065 is not experiencing any congestion, the DBUM does not direct the source host 1015 to adjust bandwidth allocation. In other embodiments, the DBUM directs the source host 1015 to increase or decrease bandwidth allocation by increasing or decreasing the size of the congestion window regardless of whether the flow 1065 experiences congestion based on the DBUM's determination that the flow 1060 has run to completion and thus additional bandwidth is available.

At the time T3, no active flows are detected between the source host 1010 and the destination host 1020, while bandwidth allocation to the application traffic flow 1065 has increased, as indicated by the thicker line used to depict the application traffic flow 1065. In some embodiments, the flow 1065 is a VM migration flow and at time T1, the VM migration flow 1065 is in its pre-copy phase, while by time T3, the VM migration flow 1065 has entered its switchover phase and as such, the source host 1015 increases the bandwidth allocated (i.e., increases the TCP congestion control window size) to the flow 1065 to ensure the VM migration runs to completion without experiencing any network issues (e.g., packet loss, latency, etc.).

While the example provided in FIG. 10 involves an increase in bandwidth allocation to a flow based on, e.g., another flow running to completion, other example embodiments decrease bandwidth allocation (i.e., decrease the size of the congestion window) in response to new flows being added to the network, and/or based on other flows in the network entering new phases during their lifecycles. For instance, a particular flow is allocated a first amount of bandwidth based on a reduced number of flows traversing the network at a first time, and a second amount of bandwidth that is less than the first amount at a second time based on a group of flows (e.g., management flows) being added to the network.

In some embodiments, the additional flows can cause network issues, such as increased latency that results in more time between receiving acknowledgements, and based on this increased latency, the source host decreases the size of the TCP congestion control window without direction from the DBUM. In other embodiments, the source host makes bandwidth allocation adjustments based on its own local contextual data, as well as when directed by the DBUM.

Additionally, the increase and decrease in bandwidth allocation to flows is not limited to other flows starting or ending, according to some embodiments. Bandwidth allocation, in some embodiments, is increased or decreased (or increased faster/slower or decreased faster/slower) in response to the application-level contextual information about another flow's state change. The two flows involved can be of the same type, in some embodiments, or of different types. For example, when there are two VM migration flows, one flow may be in the pre-copy phase (i.e., the lower priority phase) while the other flow is in the switchover phase (i.e., the higher priority phase). Because the DBUM is aware the state changed for the second flow from the pre-copy phase to the switchover phase, the DBUM can decide to decrease the bandwidth for the first flow that is still in the pre-copy phase, and increase the bandwidth for the second flow that has entered the switchover phase.

Figure 11:
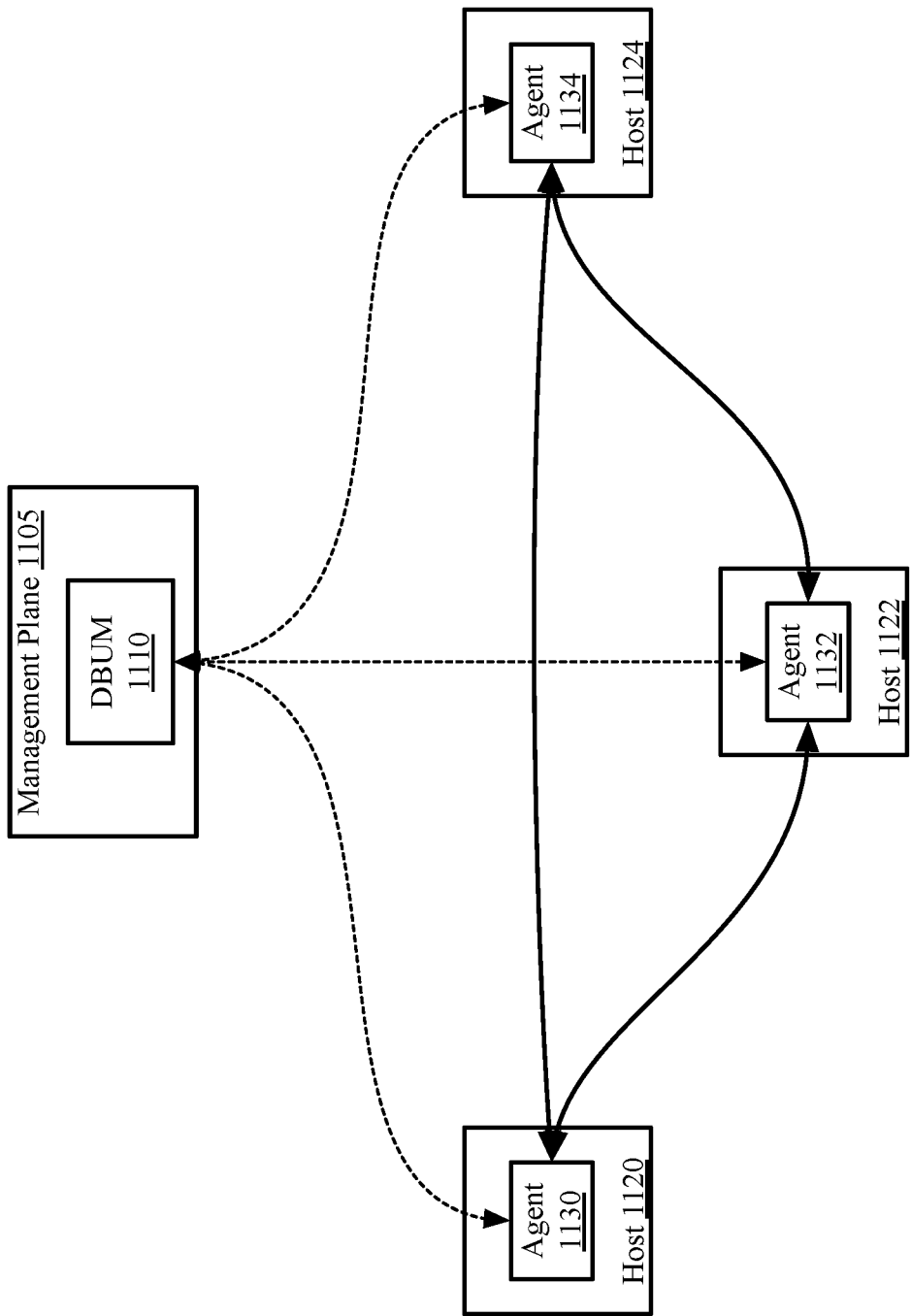
FIG. 11 conceptually illustrates a network of some embodiments that includes multiple host computers and a DBUM that is part of a management plane of the network.

In some embodiments, in addition to the centralized DBUM described above, local agents deployed on hosts in a network share with each other the contextual data and bandwidth utilization data used by the transport layers to adjust the size and rate of increase/decrease of the TCP congestion control windows. As a result, each host is able to make decisions for TCP congestion control based on both contextual data known to the host and contextual data received from the other hosts in the network. FIG. 11 conceptually illustrates a network 1100 of some embodiments that includes multiple host computers and a DBUM that is part of a management plane of the network.

As shown, the network 1100 includes the DBUM 1110 in the management plane 1105 and multiple hosts 1120, 1122, and 1124. A respective local agent 1130, 1132, and 1134 is deployed to each of the hosts 1120-1124. The local agents 1130-1134 are in a full mesh with each other and with the DBUM 1110. While shown in conjunction in the network 1100, the local agents 1130-1134 in other embodiments are deployed as an alternative to the DBUM 1110. In some embodiments, the DBUM 1110 is used to share state data across different clusters or LANs connected by a WAN such that each LAN or cluster has a local DBUM that shares the state data with each other local DBUM to allow each LAN or cluster a complete view across all connected LANs and/or clusters.

As the transport layers of the networking stacks (not shown) of the hosts 1120-1124 periodically receive contextual data from the application layers of the networking stacks (not shown) and compute bandwidth utilization by flows originating from each of the hosts 1120-1124, the agents 1130-1134 collect and distribute state data to each other agent 1130-1134. In some embodiments, the state data also includes contextual data and bandwidth utilization measurements from the networking stacks.

Each host 1120-1124 then uses the received state data in conjunction with the host's own state data and contextual data and bandwidth utilization calculations, as well as the current maximum window size (bandwidth threshold) specified for a flow, to increase or decrease the size of the TCP congestion control windows and/or increase or decrease the rate at which the size of the TCP congestion control windows are increased or decreased for the flow, according to some embodiments.

For example, if host 1120 receives contextual data and bandwidth utilization calculations from host 1124 that indicate host 1124 is a source of a high priority packet flow that is allocated a large amount of bandwidth (e.g., an elephant flow), the host 1120 can decrease the rate of increase in size of a TCP congestion window, or alternatively increase the rate of decrease in size of the TCP congestion window, for one of its packet flows that is a lower priority than the packet flow from host 1124. In other words, each host 1120-1124 is enabled to make decisions based on both local data on the host itself, as well as overall network data received from the other hosts. In some embodiments, only source hosts distribute flow data to other hosts, while in other embodiments, all hosts distribute flow to all other hosts.

DBUMs in some embodiments are distributed to various LANs (local area networks) connected by a WAN (wide-area network). In some such embodiments, agents deployed on hosts within each LAN periodically send state data associated with flows processed by the hosts to a DBUM deployed for the LAN, and the DBUMs distribute this state data to each other across the WAN in order to enable each DBUM to have a global view of all flows across LANs connected by the WAN. The DBUMs, in some embodiments, make bandwidth allocation decisions for the hosts within their respective LANs, and direct the hosts to adjust bandwidth allocations to flows based on the global state data. In other embodiments, each of the DBUMs provides the global state data to each host in their respective LAN to enable the hosts to make bandwidth allocation decisions on an individual host basis.

In some embodiments, a standard leader election algorithm is leveraged among the hosts to which local DBUM agents are deployed in order to elect a leader host to make informed decisions in a similar fashion to the centralized DBUM 810 described above. The standard leader election algorithm of some embodiments is coupled with standard gossiping protocols (i.e., peer-to-peer communications to disseminate data to members of a group similar to how epidemics spread). The standard gossiping protocols of some embodiments allow each host to share its local flow information with other hosts in the cluster or network. In some such embodiments, the elected leader host makes its decisions using the information received via the standard gossiping protocols.

Many of the above-described features and applications are implemented as software processes that are specified as a set of instructions recorded on a computer-readable storage medium (also referred to as computer-readable medium). When these instructions are executed by one or more processing unit(s) (e.g., one or more processors, cores of processors, or other processing units), they cause the processing unit(s) to perform the actions indicated in the instructions. Examples of computer-readable media include, but are not limited to, CD-ROMs, flash drives, RAM chips, hard drives, EPROMs, etc. The computer-readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 12:
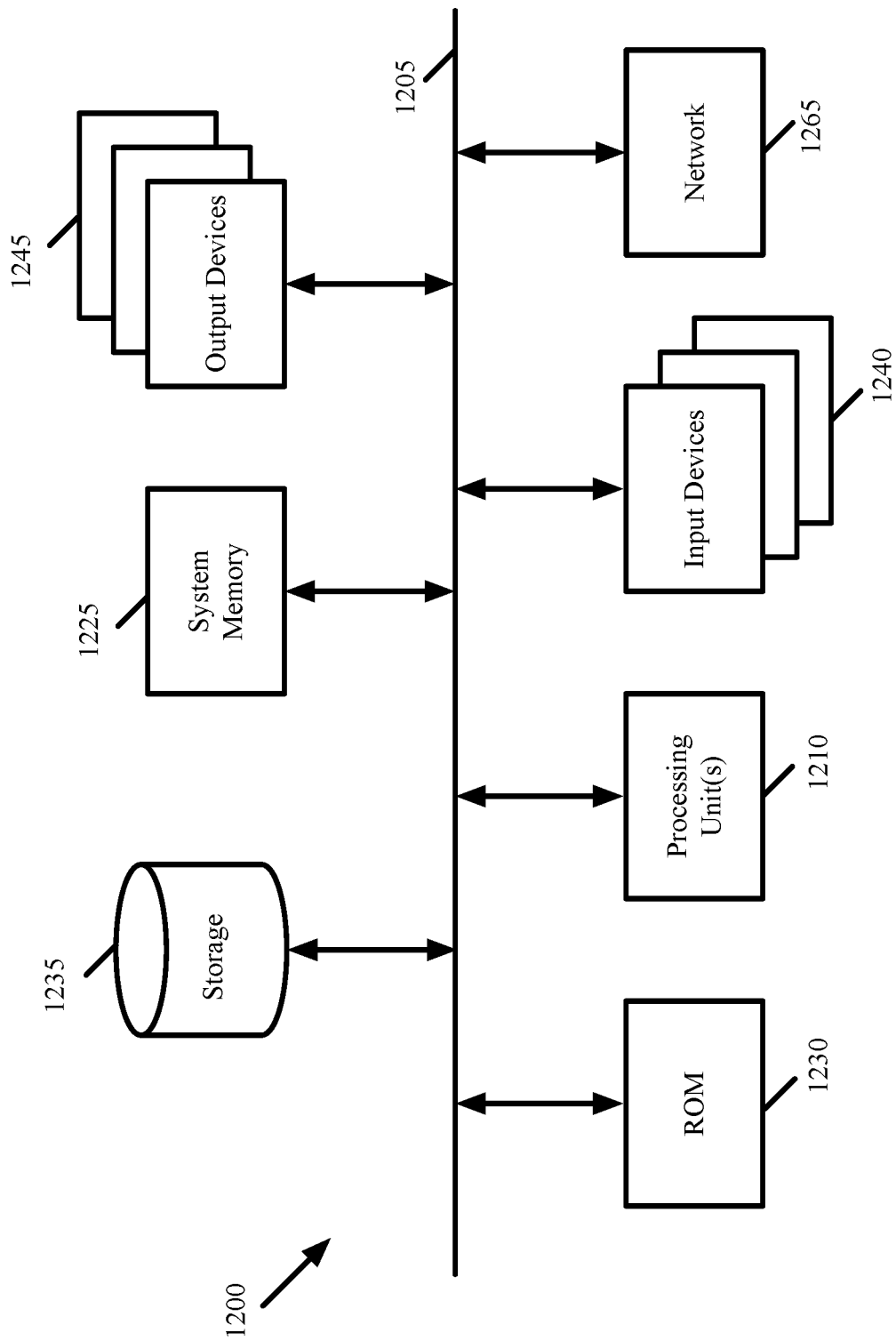
FIG. 12 conceptually illustrates a computer system with which some embodiments of the invention are implemented.

FIG. 12 conceptually illustrates a computer system 1200 with which some embodiments of the invention are implemented. The computer system 1200 can be used to implement any of the above-described hosts, controllers, gateway, and edge forwarding elements. As such, it can be used to execute any of the above described processes. This computer system 1200 includes various types of non-transitory machine-readable media and interfaces for various other types of machine-readable media. Computer system 1200 includes a bus 1205, processing unit(s) 1210, a system memory 1225, a read-only memory 1230, a permanent storage device 1235, input devices 1240, and output devices 1245.

The bus 1205 collectively represents all system, peripheral, and chipset buses that communicatively connect the numerous internal devices of the computer system 1200. For instance, the bus 1205 communicatively connects the processing unit(s) 1210 with the read-only memory 1230, the system memory 1225, and the permanent storage device 1235.

From these various memory units, the processing unit(s) 1210 retrieve instructions to execute and data to process in order to execute the processes of the invention. The processing unit(s) 1210 may be a single processor or a multi-core processor in different embodiments. The read-only-memory (ROM) 1230 stores static data and instructions that are needed by the processing unit(s) 1210 and other modules of the computer system 1200. The permanent storage device 1235, on the other hand, is a read-and-write memory device. This device 1235 is a non-volatile memory unit that stores instructions and data even when the computer system 1200 is off. Some embodiments of the invention use a massstorage device (such as a magnetic or optical disk and its corresponding disk drive) as the permanent storage device 1235.

Other embodiments use a removable storage device (such as a floppy disk, flash drive, etc.) as the permanent storage device. Like the permanent storage device 1235, the system memory 1225 is a read-and-write memory device. However, unlike storage device 1235, the system memory 1225 is a volatile read-and-write memory, such as random access memory. The system memory 1225 stores some of the instructions and data that the processor needs at runtime. In some embodiments, the invention's processes are stored in the system memory 1225, the permanent storage device 1235, and/or the read-only memory 1230. From these various memory units, the processing unit(s) 1210 retrieve instructions to execute and data to process in order to execute the processes of some embodiments.

The bus 1205 also connects to the input and output devices 1240 and 1245. The input devices 1240 enable the user to communicate information and select commands to the computer system 1200. The input devices 1240 include alphanumeric keyboards and pointing devices (also called "cursor control devices"). The output devices 1245 display images generated by the computer system 1200. The output devices 1245 include printers and display devices, such as cathode ray tubes (CRT) or liquid crystal displays (LCD). Some embodiments include devices such as touchscreens that function as both input and output devices 1240 and 1245.

Finally, as shown in FIG. 12, bus 1205 also couples computer system 1200 to a network 1265 through a network adapter (not shown). In this manner, the computer 1200 can be a part of a network of computers (such as a local area network ("LAN"), a wide area network ("WAN"), or an Intranet), or a network of networks (such as the Internet). Any or all components of computer system 1200 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application-specific integrated circuits (ASICs) or field-programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms "display" or "displaying" mean displaying on an electronic device. As used in this specification, the terms "computer-readable medium," "computer-readable media," and "machine-readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

The invention claimed is:

1. A method for performing congestion control for a particular packet flow associated with a source first host computer operating in a network, the method comprising:
at the source first host computer:
using a bandwidth threshold specified for the particular packet flow to define a maximum window size for a congestion control window that determines an amount of bandwidth allocated to the particular packet flow;
periodically receiving sets of contextual data associated with the particular packet flow; and
for the received sets of contextual data, iteratively:
computing a current bandwidth consumption by the particular packet flow; and
based on the sets of contextual data, the current bandwidth consumption, and the maximum window size, adjusting the amount of bandwidth allocated to the particular packet flow by adjusting a size of the congestion control window.

2. The method of claim 1, wherein said using, receiving, computing, and adjusting are performed by a transport layer of a networking stack of the source first host computer.

3. The method of claim 2, wherein using the bandwidth threshold specified for the particular packet flow comprises receiving the bandwidth threshold from an application layer of the networking stack.

4. The method of claim 3, wherein periodically receiving sets of contextual data comprises periodically receiving sets of contextual data from the application layer.

5. The method of claim 4, wherein periodically receiving sets of contextual data associated with the particular packet flow further comprises periodically receiving sets of contextual data associated with at least one other packet flow originating from the source first host computer.

6. The method of claim 1, wherein the congestion control window controls the amount of bandwidth allocated to the particular packet flow by controlling an amount of data sent by the first source host computer as part of the particular packet flow before receiving an acknowledgement from a destination of the particular packet flow.

7. The method of claim 6, wherein adjusting the size of the congestion control window comprises one of (i) increasing the size of the congestion control window to increase the amount of data that can be sent as part of the particular packet flow before receiving an acknowledgement from the destination of the particular packet flow and (ii) decreasing the size of the congestion control window to decrease the amount of data that can be sent as part of the particular packet flow before receiving an acknowledgement from the destination of the particular packet flow.

8. The method of claim 7, adjusting the size of the congestion control window further comprises adjusting a rate at which the size of the congestion control window is adjusted.

9. The method of claim 8, wherein:
the bandwidth threshold comprises a first bandwidth threshold for a first time period and the maximum window size comprises a first maximum window size for the first time period;
when the size of the congestion window is greater than the first maximum window size during the first time period, the method comprises entering a congestion avoidance mode; and
the size of the congestion window is increased at a first rate during the congestion avoidance mode.

10. The method of claim 9, wherein during the congestion avoidance mode, when the size of the congestion window is greater than a second maximum window size determined by a second threshold specified for bandwidth consumption during a second time period, the method comprises increasing the size of the congestion window at a second rate that is slower than the first rate.

11. The method of claim 10, wherein when congestion is detected during the congestion avoidance mode, the method comprises entering a congestion recovery mode, wherein during the congestion recovery mode, a third bandwidth threshold is specified for the particular packet flow and used to define a third maximum window size of the congestion control window.

12. The method of claim 11, wherein (i) the third bandwidth threshold is half of the second bandwidth threshold and (ii) the third maximum window size is half of the second maximum window size.

13. The method of claim 12, wherein during the congestion recovery mode, when the computed bandwidth consumption reaches the third threshold, the method comprises decreasing the size of the congestion window at a third rate that is faster than the first rate.

14. The method of claim 1, wherein adjusting the size of the congestion control window to adjust the amount of bandwidth allocated to the particular packet flow comprises adjusting a priority level of the particular packet flow, wherein higher priority packet flows receive greater bandwidth allocations than lower priority packet flows.

15. The method of claim 1, wherein computing bandwidth consumption comprises measuring a rate of a connection for the particular packet flow by monitoring a rate of returning acknowledgements from a destination of the particular packet flow.

16. The method of claim 1, wherein the particular packet flow comprises a machine migration packet flow for migrating a machine from the source first host computer to a destination second host computer.

17. The method of claim 16, wherein:
migrating the machine comprises migrating the machine over a set of machine migration phases;
each set of contextual data comprises an indication of a machine migration phase from the set of machine migration phases, and
adjusting the size of the congestion control window comprises adjusting the size of the congestion control window based on the indicated machine migration phase of the particular packet flow.

18. The method of claim 17, wherein the machine comprises a virtual machine (VM).

19. The method of claim 1, wherein the particular packet flow comprises an active packet flow.

20. A non-transitory machine readable medium storing a program for a source first host computer which when executed by a set of processing units performs congestion control for a particular packet flow associated with the source first host computer operating in a network, the program comprising sets of instructions for:
using a bandwidth threshold specified for the particular packet flow to define a maximum window size for a congestion control window that determines an amount of bandwidth allocated to the particular packet flow;
periodically receiving sets of contextual data associated with the particular packet flow; and
for the received sets of contextual data, iteratively:
computing a current bandwidth consumption by the particular packet flow; and
based on the sets of contextual data, the current bandwidth consumption, and the maximum window size, adjusting the amount of bandwidth allocated to the particular packet flow by adjusting a size of the congestion control window.

\* \* \* \* \*